United States Patent [19]

Gross et al.

[11] 4,057,088

[45] Nov. 8, 1977

[54] APPARATUS FOR FORMING SERRATIONS IN OPPOSED EDGES OF WOODEN PANELS FOR USE IN I-BEAMS

[75] Inventors: Donald Ralph Gross, Emmett; Nick Lewis Schaefer, Boise; John Raymond Russell, Boise; Clifford Ray Johnson, Boise, all of Idaho

[73] Assignee: Trus Joist Corporation, Boise, Idaho

[21] Appl. No.: 718,352

[22] Filed: Aug. 27, 1976

[51] Int. Cl.$^2$ ............................................. B27F 1/06
[52] U.S. Cl. ...................................... 144/91; 83/282; 83/415; 90/77; 90/88; 144/309 L; 144/323; 271/236
[58] Field of Search ...................... 83/282, 415, 435.2; 144/2 R, 90 R, 90 A, 91, 309 R, 309 L, 321, 323, 136 R; 90/70, 76, 78, 77, 82, 87, 88; 198/738, 747, 748

[56] References Cited

U.S. PATENT DOCUMENTS

| | | | |
|---|---|---|---|
| 557,076 | 2/1897 | Sherman | 144/91 |
| 1,938,233 | 12/1933 | Vallone et al. | 90/70 |
| 2,052,248 | 8/1936 | Roehm | 90/88 X |
| 2,194,568 | 3/1940 | Romaine et al. | 90/77 X |

Primary Examiner—Willie G. Abercrombie
Assistant Examiner—W. D. Bray
Attorney, Agent, or Firm—Eugene D. Farley

[57] ABSTRACT

An apparatus for forming serrated edges in wooden panels for interengagement with abutting panels in a wooden I-beam assembly comprises opposed sets of broaches operable for cutting a toothed serration pattern cleanly and accurately in opposed edges of a stack of up to 40 such panels simultaneously. The panels are loaded in infeed means of the apparatus which transports the stack into position for broaching. The stack of panels is aligned laterally by lateral stack alignment means upon placement of the panels in the infeed means. Longitudinal stack alignment means aligns the stack longitudinally when it is transported by the infeed means to a position for broaching. During broaching the stack is supported on opposed anvils in a manner for forming the serrations symmetrically with respect to each end of the stack, hold down means clamps the stack on the anvils, and actuation means drives the broaches downwardly.

15 Claims, 19 Drawing Figures

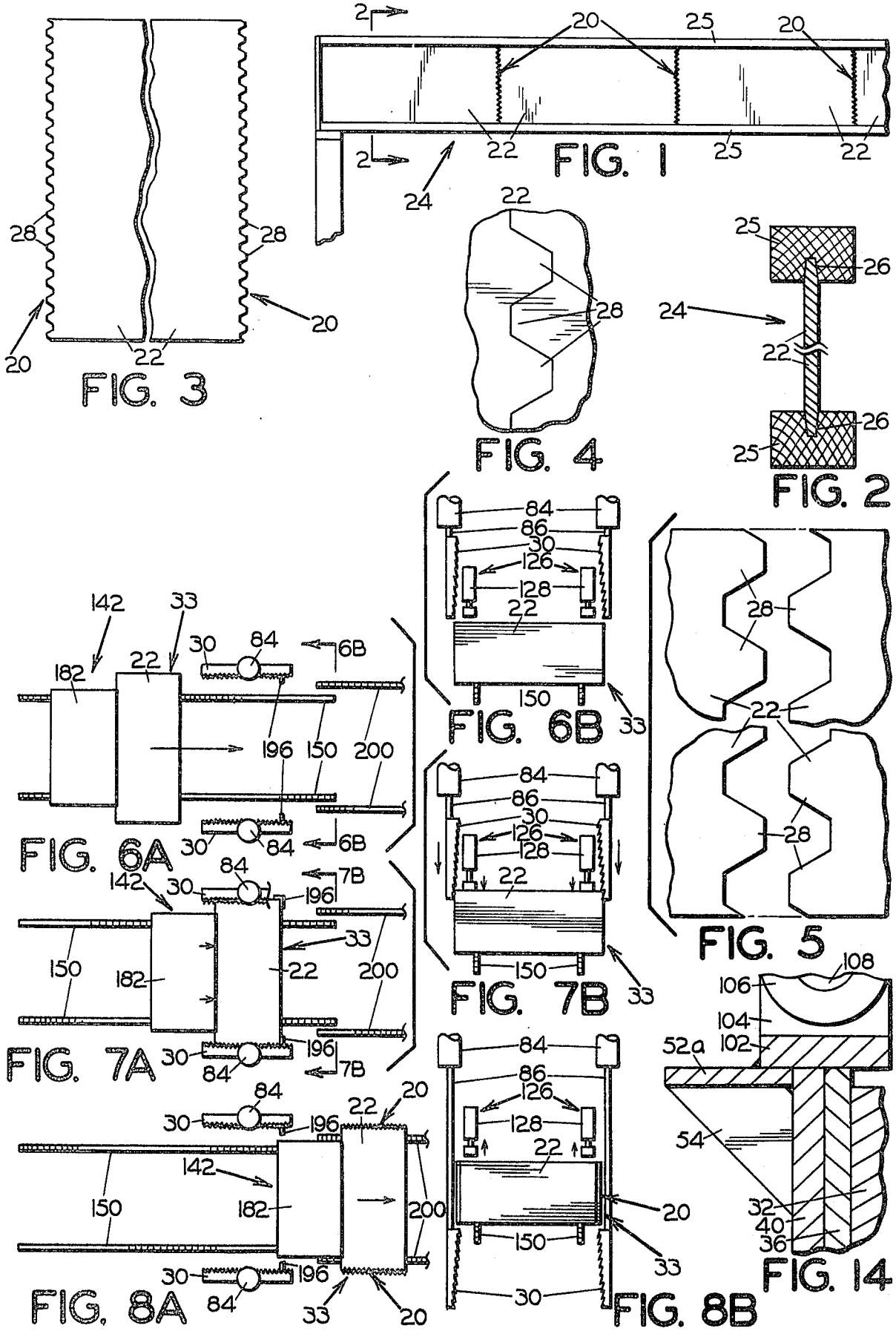

APPARATUS FOR FORMING SERRATIONS IN OPPOSED EDGES OF WOODEN PANELS FOR USE IN I-BEAMS

BACKGROUND OF THE INVENTION

This invention relates to an apparatus for forming serrations in the opposed edges of wooden panels. In particular it pertains to serrating apparatus which forms serrations simultaneously and accurately in a stack of wooden panels.

In modern construction technology, wooden I-beams are formed from elongated upper and lower wooden chords interconnected by wooden webs, which preferably comprise a number of plywood panels joined end to end. In order to increase the shear strength in the joints between the panels, adjacent abutting panels are formed with interengaging serrated edges.

Forming the serrations in the edges of the panels heretofore has been a time consuming and costly operation. First, the tooth pattern must be formed accurately in each of the edges and must be symmetrical at its extremities so that the panels will be aligned with each other. In addition due to the frangible character of the plywood web material the serrations must be formed with great care and the teeth must have truncated tips to prevent breakage.

Thus the use of panels having serrated edges has been expensive and therefore limited to applications where shear loading is critical.

It is the general purpose of the present invention to provide an apparatus having a high capacity for mass producing serrations simultaneously in the edges of a stack of up to 40 panels accurately and quickly.

It is a further object of the present invention to provide such an apparatus that can be operated by unskilled labor.

It is a further object of the present invention to provide such an apparatus that forms the tooth pattern of the serrations cleanly with minimum damage or breakage of the teeth.

It is a further object of the present invention to provide such an apparatus which forms a tooth pattern which is repeatable from panel to panel.

It is a further object of the present invention to provide such an apparatus that can cut tooth patterns of different depth and shape.

It is a further object of the present invention to provide such an apparatus having cutting elements which are easily replaceable for sharpening, repair or replacement.

THE DRAWINGS

The manner in which the foregoing and other objects of the invention are accomplished will be apparent from the accompanying specification and claims, considered together with the drawings wherein:

FIG. 1 is a fragmentary view in side elevation of an I-beam assembly incorporating panels having serrations of the type formed by the apparatus of the present invention;

FIG. 2 is a foreshortened sectional view taken on the line 2—2 of FIG. 1;

FIG. 3 is a foreshortened plan view showing one of the panels in detail;

FIG. 4 is a fragmentary plan view of two abutting panels showing the tooth pattern of the serrations;

FIG. 5 is a fragmentary, foreshortened, exploded plan view of two abutting panels showing the relationship of the tooth pattern to the ends of the panels;

Figure 9A:
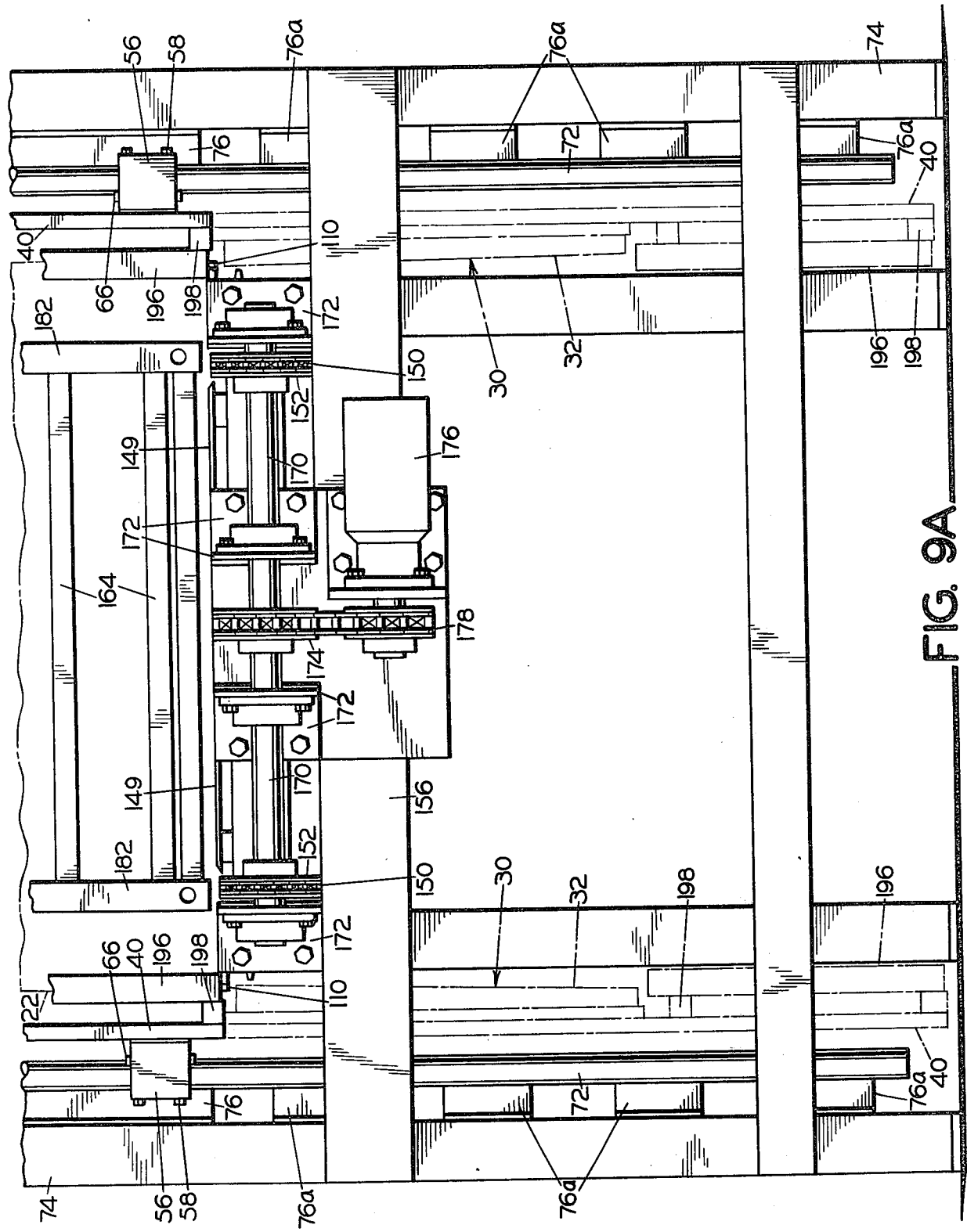

FIGS. 6A—8A are semi-diagrammatic plan views showing the operational sequence of the apparatus of the present invention;

FIGS. 6B—8B are semi-diagrammatic views in end elevation corresponding to FIGS. 6A—8A, respectively;

FIG. 9A is a fragmentary view in end elevation showing a portion of the apparatus of the present invention.

Figure 9B:
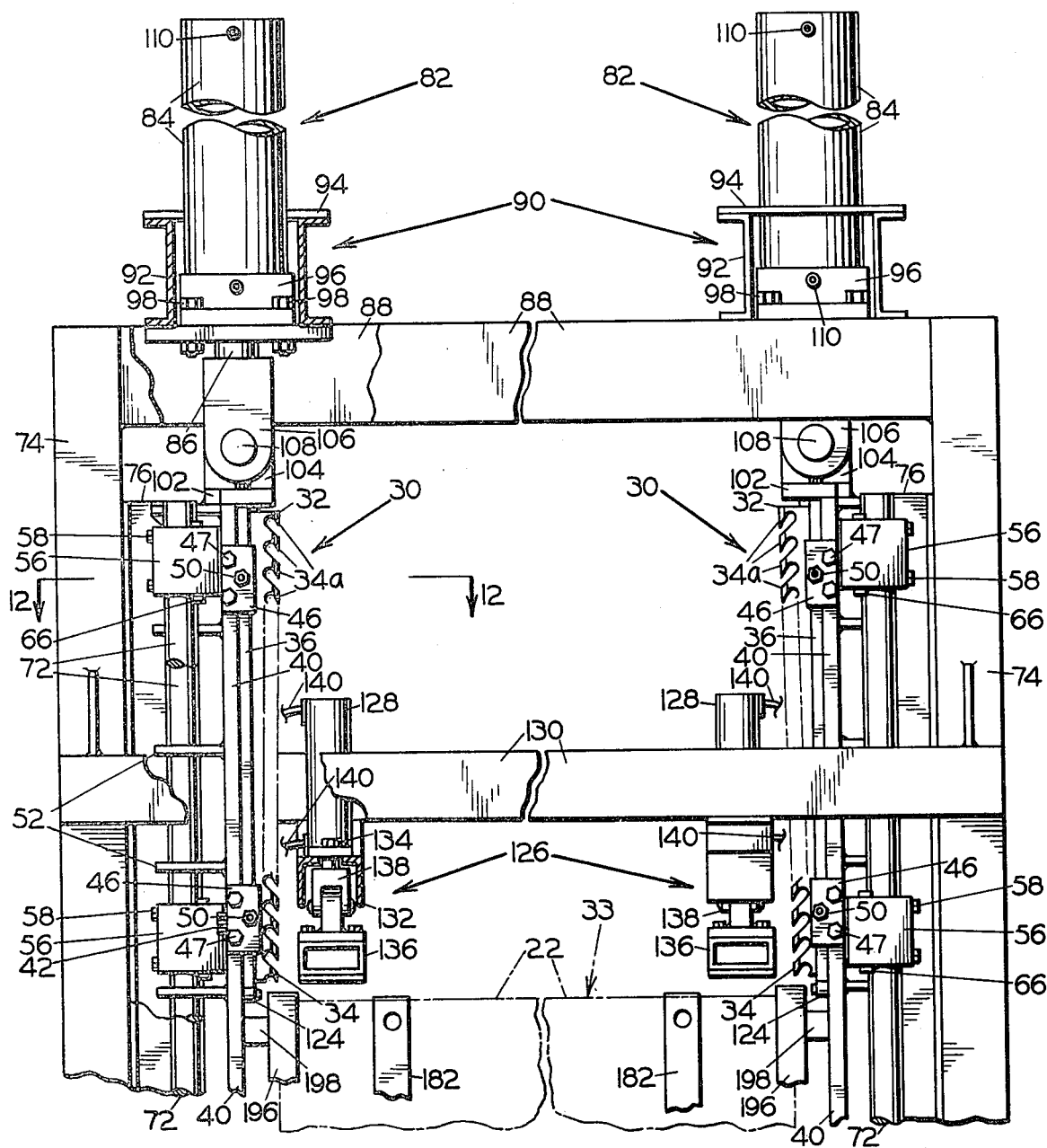
Figure 13:
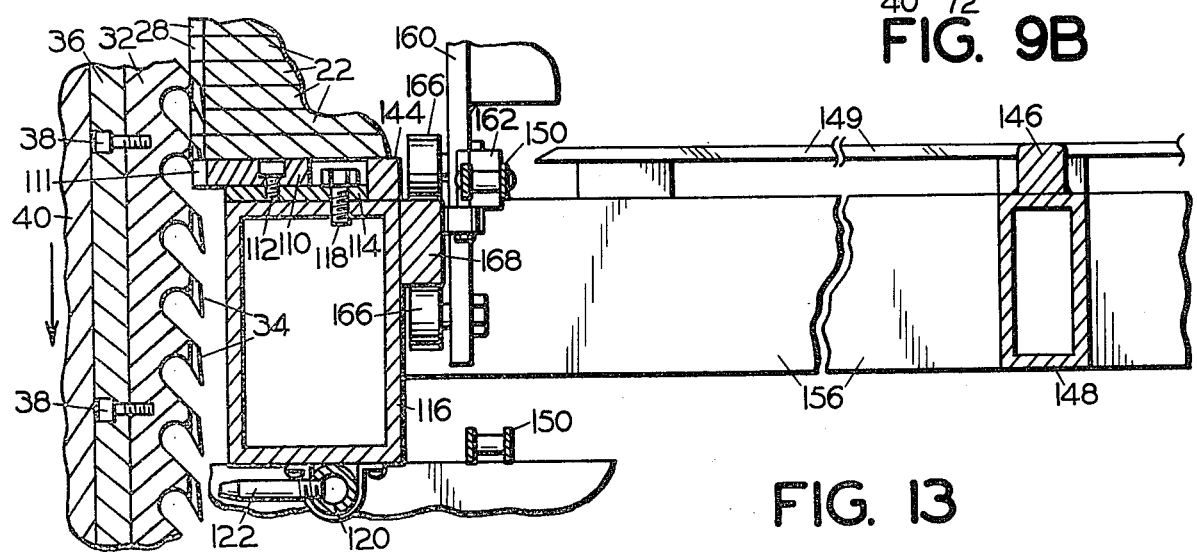
Figure 10A:
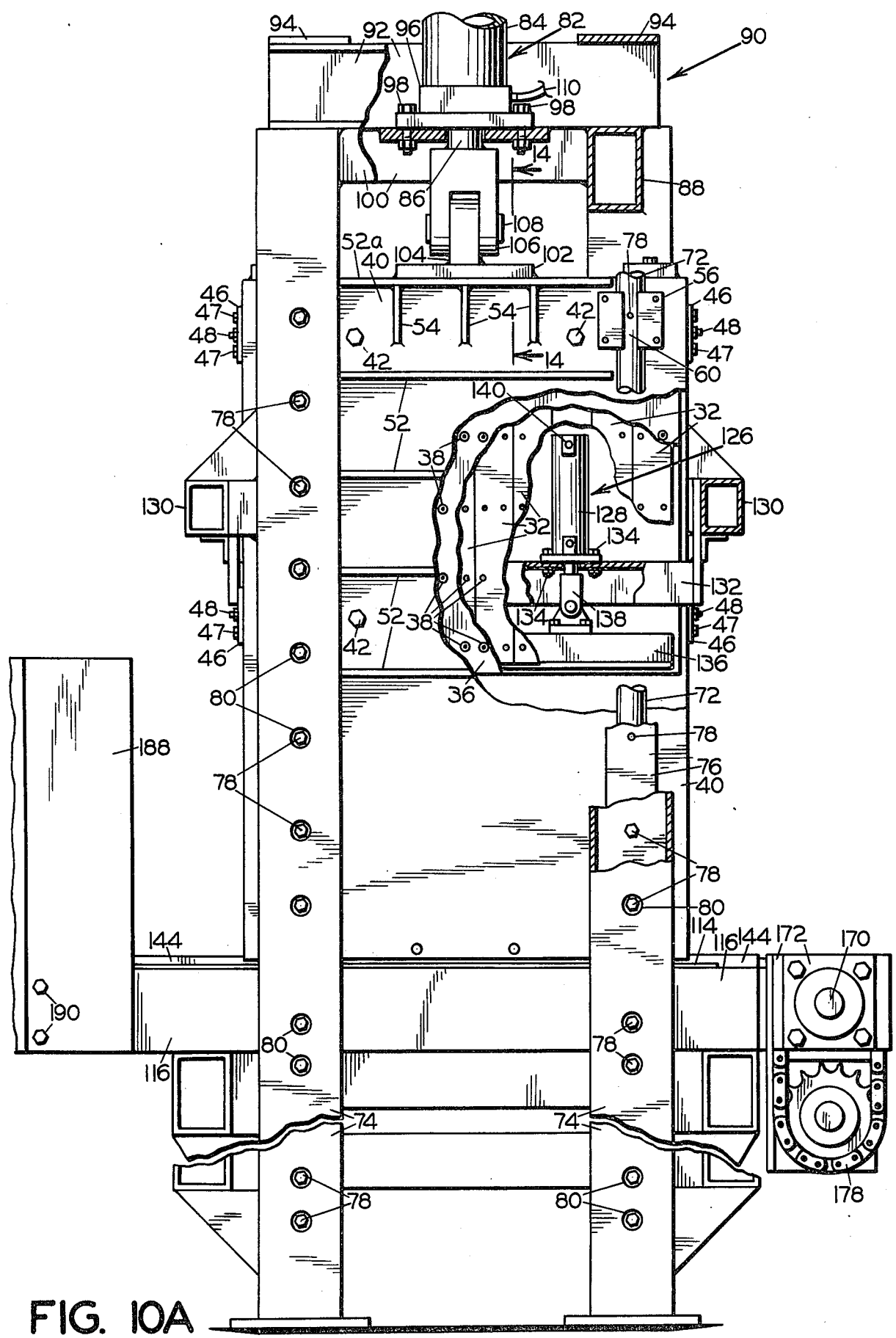
Figure 10B:
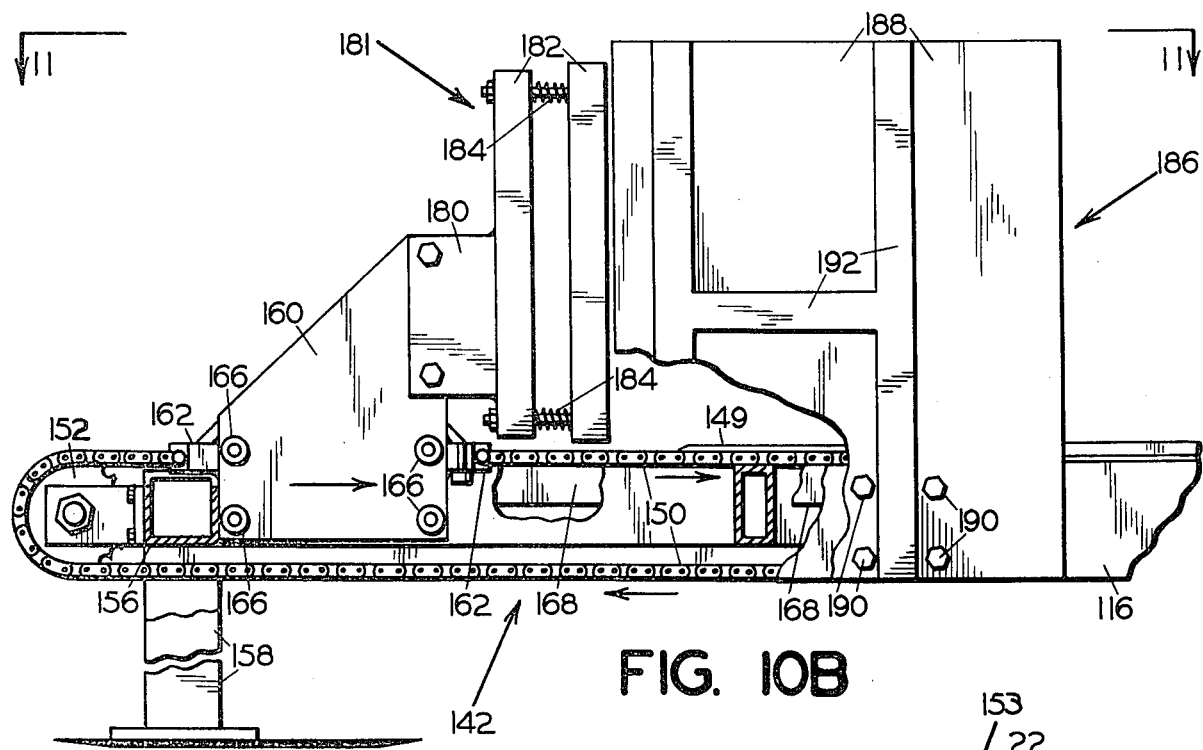
Figure 11:
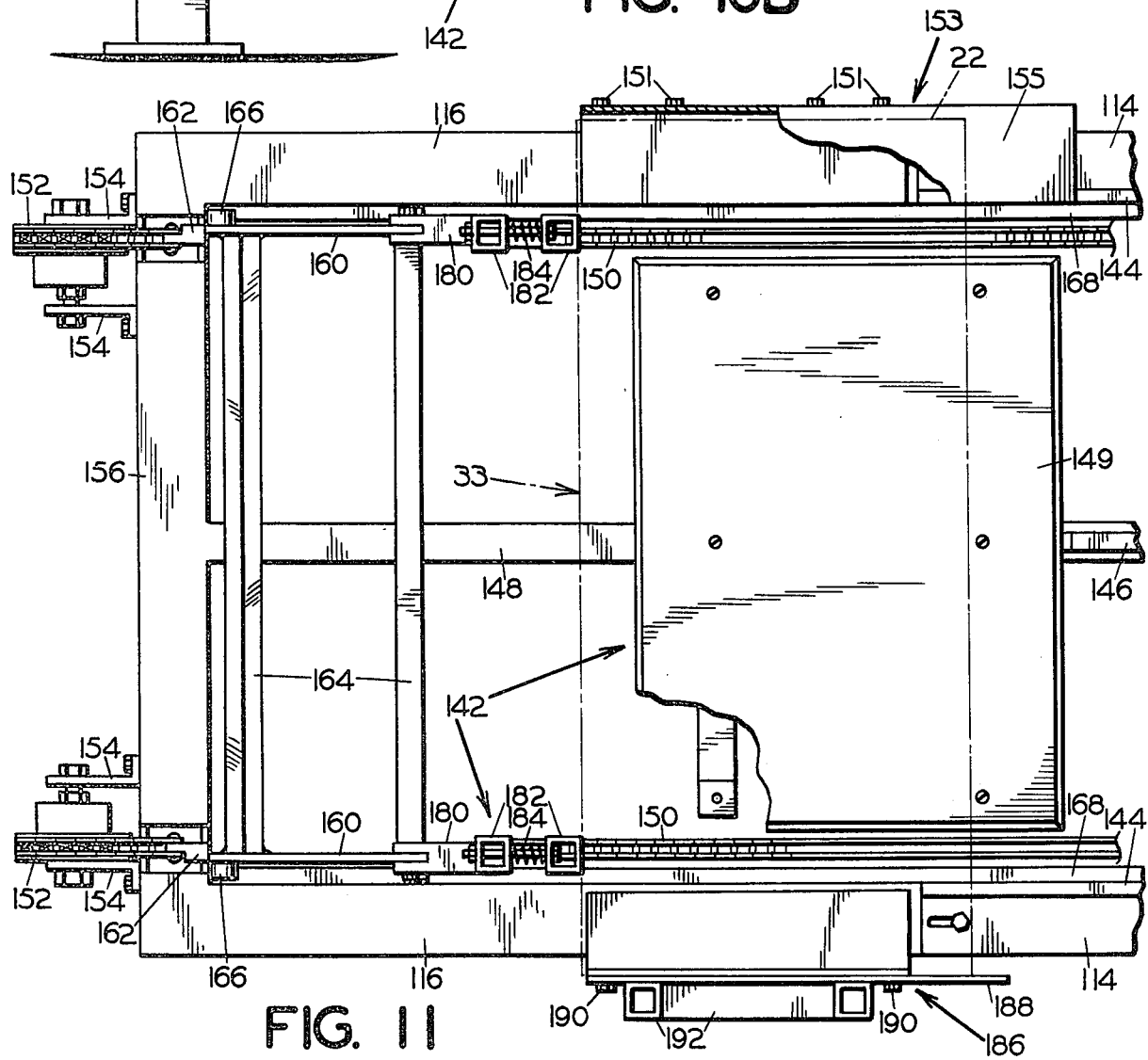
Figure 12:
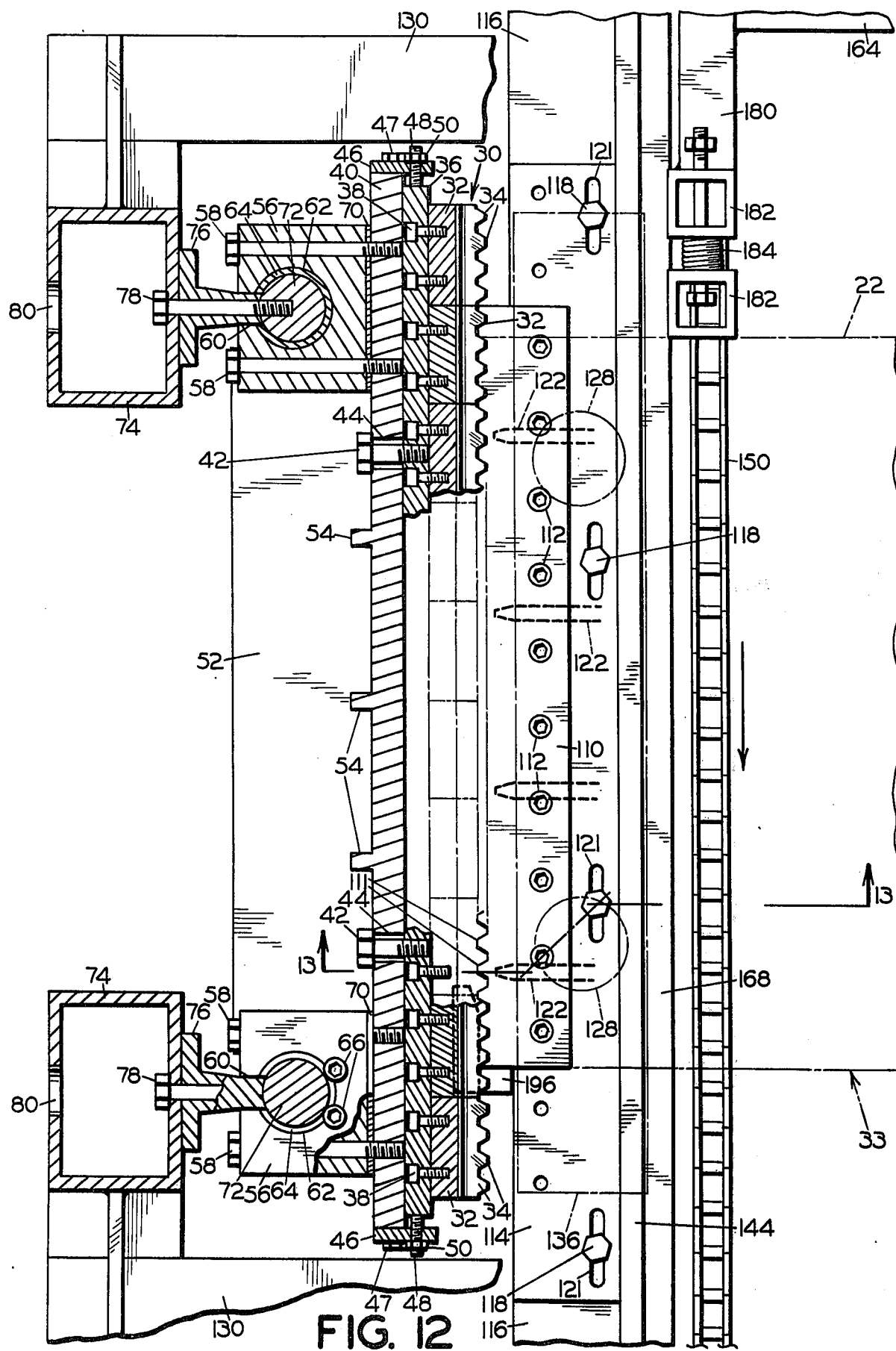

FIG. 9B is a fragmentary foreshortened view in end elevation with portions broken away to show details of concealed structure, showing the remainder of the apparatus;

FIGS. 10A and 10B are fragmentary, foreshortened views in side elevation of the apparatus, with portions broken away to show concealed structure;

FIG. 11 is a fragmentary plan view taken along the line 11—11 of FIG. 10B, with portions broken away to show concealed structure;

FIG. 12 is a fragmentary, sectional view taken on the line 12—12 of FIG. 9B, with portions broken away to show concealed structure;

FIG. 13 is a fragmentary, foreshortened, sectional view taken on the line 13—13 of FIG. 12; and FIG. 14 is a fragmentary, sectional view taken along the line 14—14 of FIG. 10A.

GENERAL STATEMENT OF THE INVENTION

The apparatus of the present invention broadly comprises two spaced sets of broaches mounted above mating anvils which support a stack containing up to 40 aligned panels. The broaches are movable downwardly by actuation means for cutting serrations in the opposed edges of the panels simultaneously. The stack of panels is moved into a broaching position on the anvils by infeed means having longitudinal stack alignment means which aligns the stack with respect to the broaches in a manner causing the tooth pattern of the serrations to be symmetrical on each end of the panels. Hold down means clamp the panels firmly against the anvils during the broaching operation.

DETAILED DESCRIPTION OF A PREFERRED EMBODIMENT

Referring first to FIGS. 1, 2, 3 and 4, the apparatus of the present invention is used for forming serrated edges 20 in the opposed longitudinal margins of panels 22 for use in a wooden I-beam assembly 24 of the general class under consideration in Troutner U.S. Pat. Nos. 3,616,091 and 3,894,908. The serrated edges are united adhesively to each other joining the panels end to end, FIG. 4, with the serrated edges forming joints having increased shear strength as compared to conventional butt joints heretofore used for this purpose. The joined panels then are used in the composite I-beam assembly, FIGS. 1 and 2, which includes upper and lower chords 25 having V-shaped grooves 26 along their inwardly facing longitudinal margins. The panels are compressed and glued into the grooves to form the I-beam.

Preferably the serrations comprise teeth 28 having a contour in plan of oppositely facing truncated triangles. Referring to FIG. 5 the tooth pattern may be located along the edges of the panels in any desired orientation. However, the pattern must be symmetrical at each end so that each panel will mate with its adjacent panel when two panels are joined end to end. Preferably the sides of the triangles have angles of from 20°–50° with the points of the teeth truncated to prevent damage to them upon joinder of the panels.

Referring to FIGS. 9A and 9B, the apparatus for forming the serrations includes two opposed sets of broaches 30 spaced apart by a distance nominally equal to the width of the panels 22 and configured for cutting the tooth pattern into a stack 33 of the panels. In the embodiment illustrated the stack comprises up to 40 32" x 48" panels of ½-inch plywood.

Each set of broaches comprises a plurality of elongated broach plates 32 each defining in plan four teeth of the serration pattern, FIG. 12. In the embodiment illustrated the broach plates are about 20 inches long and include a plurality of downwardly facing cutting teeth 34. The broach plates are tapered slightly so that each tooth makes a cut slightly deeper than the preceding tooth. However, the top four teeth of each are cleaning teeth 34a and are all the same height. The total extent of the taper approximately is equal to the depth of the serrated tooth pattern desired and the broach sets are spaced apart from one another by a distance which allows the bottom cutting tooth on each set to clear the stacks of panels.

The broach plates are mounted co-planar side by side on mounting plates 36 by means of bolts 38. Thus they may be removed individually for sharpening or replacement. The mounting plates extend the entire length of the broach plates and have a width which is wider than the edges of the panels.

The mounting plates are mounted on backing plates 40 by means of bolts 42. The openings 44 through which the bolts pass are elongated slightly, allowing lateral adjustment of the mounting plates relative to the backing plates. To this end adjustment means 46 are joined to each end of the backing plate by bolts 47. Adjusting screws 48 fit through threaded openings in the adjustment means and through lock nuts 50 to engage the ends of the mounting plates for positioning them laterally.

The backing plates are stiffened by stiffeners 52, FIG. 10A, integrally attached to the backing plates at spaced intervals and extending perpendicular thereto in the manner of the uppermost stiffeners 52a shown in FIG. 14. The uppermost stiffeners 52a are strengthened further by triangular gussets 54 which are fastened between the stiffeners and the backing plates, as by welding.

The backing plates are mounted on rectangular carriage blocks 56 by means of bolts 58. Each backing plate is attached to six carriage blocks with three being disposed at each lateral end of the plate and located one above the other. The carriage blocks define outwardly facing slots 60 and adjoining medial openings 62 into which annular bushings 64 are held by bolts 66.

Shims 70 are located between the carriage blocks and the backing plates allowing in-out adjustment of the broach plates, thus varying the depth of their cuts.

Elongated cylindrical tracks 72 extending substantially over the entire height of the apparatus are journaled in the bushings 64 so that the carriages, and thus the broach sets, can travel freely upwardly and downwardly in the apparatus. The tracks are mounted to elongate box beams 74, which support the apparatus at its corners, by means of T-shaped track carriers 76. Bolts 78 which secure the tracks 72 and the track carriers 76 to the inner wall of the box beams 74, are accessible through openings 80 located in the outer walls of the box beams. The track carriers 76 are continuous over the upper portion of the apparatus. However, at the lower portion where less load is carried by the track the load carriers 76a are segmented, FIG. 9A.

Mounted to the lower portions of the backing plates 40 immediately downwardly adjacent to the mounting plates 36, are a plurality of rollers 124, FIG. 9B. They are arranged to support the backing plates when bolts 42 are removed and facilitate sliding the backing plates sideways out of the apparatus for removal of the broach sets.

The broach sets are raised and lowered on the tracks between raised positions, shown in FIG. 9B, and lowered positions, shown by the dashed lines in FIG. 9A, by actuation means 82.

In the embodiment illustrated the actuation means includes double-acting hydraulic cylinders 84 mounted on top of the apparatus and having extensible rams 86 with a long reach for moving the entire length of the broach sets past the stack of panels. Two hydraulic cylinders are used, with one located medially above each backing plate between cross beams 88 which span the top extremities of box beams 74, FIG. 9B.

Mounting platforms 90 integrally attached to the cross beams 88 mount the cylinders. The mounting platforms include paired channels 92 with top plates 94 attached to each end. Integrally attached to the channels are mounting stands 96 to which the hydraulic cylinders are attached by bolts 98. End beams 100 interconnect the cross beams to give additional rigidity and strength to the apparatus.

The hydraulic cylinders 84 are attached to the backing plates through mounts 102 which are attached integrally to the top-most stiffeners 52a, FIGS. 10A and 14. Flanges 104 attached normally to the mounts are joined to clevises 106 mounted on the ends of the hydraulic cylinder rams 86 by means of pins 108. Tubing 109 passes hydraulic fluid to the hydraulic cylinders from an appropriate controlled source (not shown).

During broaching the margins of the stack of panels are supported by anvils 110, FIGS. 12 and 13. The anvils comprise thin plates which are longer than the stack of panels. They define serrated tooth patterns 111 at their outer edges which are aligned to mate with the cleaning teeth 34a of the respective broach sets. Bolts 112 secure the anvils to the mounting plates 114 allowing their removal for sharpening or replacement. The mounting plates are attached to horizontal frame elements 116 which span box beams 74. Bolts 118 pass through slots 121 in the mounting frames to attach them to the horizontal frame elements. Thus the anvils are adjustable longitudinally for alignment with the broach sets.

Located below the horizontal frame elements are cylindrical manifolds 120 for carrying compressed air from an external source to a plurality of cleaning jets 122. The cleaning jets exit the air adjacent to the broaches for cleaning wood chips from them after they pass through the stack of panels.

Hold down means 126, FIG. 9B, for clamping the stack of panels to the anvils during the broaching comprise dual acting hydraulic cylinders 128 which are supported by cross frames 130 spanning the box beams a spaced distance below cross beams 88.

Angle supports 132 which are attached at each end to the cross frames mount the hydraulic cylinders by means of bolts 134. In the embodiment illustrated four hydraulic cylinders are used, one pair located above each anvil. Each pair is attached to an elongated hold down pad 136 by means of a clevis joint 138. Controls (not shown) supply hydraulic fluid through lines 140 for operating the hydraulic cylinders, moving the pads between raised positions, shown in FIG. 9B, and lowered positions in contact with the stack of panels.

The stack of panels is positioned into the broaching position on the anvils by infeed means 142. The infeed means include elongated parallel rails 114, FIGS. 11, 13, which are mounted on horizontal frame elements 116 inwardly adjacent to the anvils.

A center rail 146 is mounted intermediate rails 144 on a center beam 148. Rails 144 and 146 are longer than the anvils, however, and extend to the outfeed or rearward end of the apparatus for transporting the stack to an outfeed conveyer (not shown) after broaching, and extend nearly to the infeed or forward end of the apparatus for transporting the stack into position for broaching.

A support plate 149 is located medially in the infeed means for supporting the stack of panels prior to their transport to the position for broaching. It is mounted coplanar with the rails 144 and 146 and has chamfered edges to prevent damage to the panels being moved on and off.

Mounted to one of the frame elements by means of bolts 151 is an L-shaped platform 153, FIG. 11, for supporting the panels as they are loaded into the infeed means. The horizontal surface 155 of the platform is located coplanar with support plate 149.

The infeed means comprises chains 150, FIGS. 10B and 11, defining closed paths and mounted at each side of the apparatus on sprockets 152. The forward sprockets are mounted rotatably on brackets 154 attached on a forward cross frame 156 which spans horizontal frame elements 116. The rearward sprockets 152 are mounted on a shaft 170 journaled in bearings on brackets 172. Mounted medially on the shaft is a drive sprocket 174 which is powered by a motor 176 through a drive chain 178.

Forward legs 158 depend from joinder with the ends of the cross frames for supporting the infeed portion of the apparatus.

Upright truck plates 160, which are connected to the ends of chains 150 through lugs 162, are separated by rods 164, FIGS. 10B and 11. Four rollers 166 are mounted rotatably on the outside surface of each truck plate in a manner for engaging a track 168. Two of the tracks are used with one joined integrally to the inside of each horizontal frame element 116.

Lugs 180 interconnect the forward portions of the truck plates 160 and pusher mechanisms 181, which engage the stack and push it into position above the anvils upon operation of the chain. The pusher mechanisms comprise front and rear pusher arms 182 interconnected by shock absorbers 184. Thus when the pusher mechanisms first contact the stack of panels and when the stack comes to rest in the broaching position, the shock absorbers are compressed slightly preventing damage to either the pusher arms or to the panels.

The stack of panels is squared in the infeed means prior to transport into position for broaching by lateral stack alignment means 186. Referring to FIGS. 10A, 10B and 11, a vertical plate 188 is attached to one of the horizontal frame elements 116 by bolts 190. An H-shaped box beam support 192 is joined to the outside surface of the plate. Thus the panels are even ended laterally in the apparatus by running them up against the plate when inserting them.

The stack of panels is aligned longitudinally in the apparatus in position for broaching by means of longitudinal stack alignment means. Elongate L-shaped stops 196, FIGS. 9A, 9B and 12, are joined to the backing plates 40 on spacers 198 in a manner for engaging the forward edges of the stack of panels. Thus the stack is aligned longitudinally with respect to the broach sets giving accurate repeatable alignment of the serrations in the panels.

OPERATION

Referring to FIGS. 9A, 11 and 13, in the operation of the herein described apparatus the panels 22 are stacked on the support plate 149 of the infeed means manually such as by a fork lift (not shown). The panels are aligned laterally in the apparatus by the lateral stack alignment means 186. Vertical plate 188 serves as a stop when the panels are loaded. Thus the panels have common side edges in the stack and are centered laterally between the broach sets 30.

At this point the panels in the stack are indexed manually longitudinally in the apparatus by an operator. This is done by striking the panels with a rubber mallet as they are stacked.

Once the panels are loaded the apparatus is activated and motor 176 rotates causing movement of chains 150. Thus truck plates 160 are translated on rollers 166 bringing pusher arms 182 into contact with the stacks of panels, FIGS. 6A and 6B. As was noted, when the pusher arms contact the panels, shock absorbers 184 are compressed slightly preventing damage to the panels or the pusher arms.

The stack of panels is slid along rails 144 and 146 until it engages stops 196, FIGS. 7A and 7B. At this point a switch (not shown) is contacted stopping motor 176 of the infeed means and actuating hydraulic cylinders 128 of the hold down means 126 clamping the stack securely against the anvils 110. It will be noted that the stops are arranged to align the panels longitudinally in the apparatus relative to the broach sets for locating the serrations accurately in the panels. Simultaneously air is supplied to manifold 120 and thus through jets 122 for cleaning the broaches.

After a slight time delay, hydraulic cylinders 84 are actuated, causing the broaches to be moved downwardly cutting the serrations in the edges of the panels. The air passing through the jets 122 cleans the wood chips from the broaches as they pass beneath the stack of panels.

When the broaches have passed completely below the stack of panels, FIGS. 8A and 8B, a switch (not shown) is contacted de-activating the hydraulic cylinders 84. The hydraulic cylinders 128 are retracted raising the hold down means, and the air supply to jets 122 is terminated. Simultaneously the motor 176 is re-activated causing the pusher mechanism 181 to push the stack of panels out of the apparatus. An outfeed conveyor 200 transports the stack out of the apparatus to other machines for further processing into the I-beam assemblies.

When the stack is out of the apparatus another switch (not shown) is contacted reversing the direction of motor 176 until the pusher mechanism has traveled to its original orientation. Then the motor is de-activated and the hydraulic cylinders 84 and the broaches to which they are coupled are retracted, readying the apparatus for another cycle.

Having thus described our invention in preferred embodiment, we claim:

1. An apparatus for forming serrations in opposed edges of wooden panels comprisng;
   a. anvils arranged for supporting a stack of the panels in the apparatus and having serrated margins located inwardly adjacent to the edges of the stack,
   b. two spaced sets of broaches having cutting faces defining the pattern of the serrations, one being mounted in the apparatus above each anvil margin and movable horizontally with respect thereto,
   c. said sets of broaches being tapered and having lower portions which are spaced apart by a distance which is substantially equal to the width of the stacks, and being arranged for cutting the serrations simultaneously in both edges of the panels when forced therepast.
   d. actuation means connected to the broaches and arranged for translating them between raised positions wherein their lower portions are above the stack and lowered positions wherein their upper portions are below the stack for simultaneously forming the serrations in both edges of the panels.

2. The apparatus of claim 1 wherein the sets of broaches are configured for forming serrations comprising teeth having the contour of oppositely facing adjacent truncated triangles.

3. The apparatus of claim 1 wherein each set of broaches comprises;
   a. a plurality of broach plates, each plate defining at least one set of serrations, said broach plates being mounted side by side over a span at least co-extensive with the length of the stack,
   b. a mounting plate mounting the broach plates in a unitary side-by-side arrangement,
   c. a backing plate mounting the mounting plate in the apparatus, and
   d. tracks slidably carrying the backing plate for movement of the sets of broaches between their raised and lowered positions.

4. The apparatus of claim 3 wherein the actuation means comprises hydraulic cylinders which operably engage the backing plates.

5. The apparatus of claim 3 including adjustment means arranged for adjusting the mounting plates laterally on the backing plates for positioning the sets of broaches for forming serrations accurately in the panel in a manner permitting interengagement of the panel with an adjacent panel with their sides coplanar.

6. The apparatus of claim 3 including mounting means releasably mounting the mounting plates to the backing plates allowing the broach plates to be removed for sharpening or replacement.

7. The apparatus of claim 6 including a plurality of rollers located on the backing plates downwardly adjacent to the mounting plates for engaging the lower edges of the mounting plates facilitating its removal from the apparatus.

8. The apparatus of claim 1 including infeed means arranged for transporting the stack into position above the anvils.

9. The apparatus of claim 8 wherein the infeed means comprises;
   a. support rails mounted longitudinally in the apparatus in a manner for supporting the stack coplanar with the anvils,
   b. chains and rotatable sprockets mounting the chains adjacent to at least two of the rails, depressed slightly therefrom,
   c. a pusher mechanism mounted on the chains and arranged for engaging the stack, and
   d. a motor arranged for transporting the chains about the sprockets translating the pusher mechanism for pushing the stack on the support rails from a loading position, clear from the broaches, to a cutting position, in alignment with the broaches.

10. The apparatus of claim 9 wherein the motor and chains are arranged for pushing the stack out of the apparatus after broaching.

11. The apparatus of claim 9 including lateral stack alignment means mounted adjacent to the chain drive for aligning the sheets in the stack laterally uniformly in a position centered between the sets of broaches.

12. The apparatus of claim 9 wherein the pusher mechanism includes upright pusher arms substantially the same length as the height of the stack of panels, and shock absorbing means resiliently mounting the pusher arms.

13. The apparatus of claim 1 including longitudinal stack alignment means mounted on the sets of broaches for aligning the stack longitudinally in the apparatus relative to the sets of broaches.

14. The apparatus of claim 1 including hold down means located between the sets of broaches and arranged for engaging the stack and urging it against the anvils during the broaching.

15. The apparatus of claim 14 wherein the hold down means comprises;
   a. pairs of hydraulic cylinders, one pair mounted above each anvil and each having an extensible ram,
   b. elongated pads, one mounted pivotally to the extremity of the rams of each pair, and
   c. control means arranged for actuating the hydraulic cylinders simultaneously upon activation of the sets of broaches.

* * * * *